(No Model.)
O. H. JEWELL.
WATER FILTER AND PURIFIER.
No. 377,388. Patented Feb. 7, 1888.
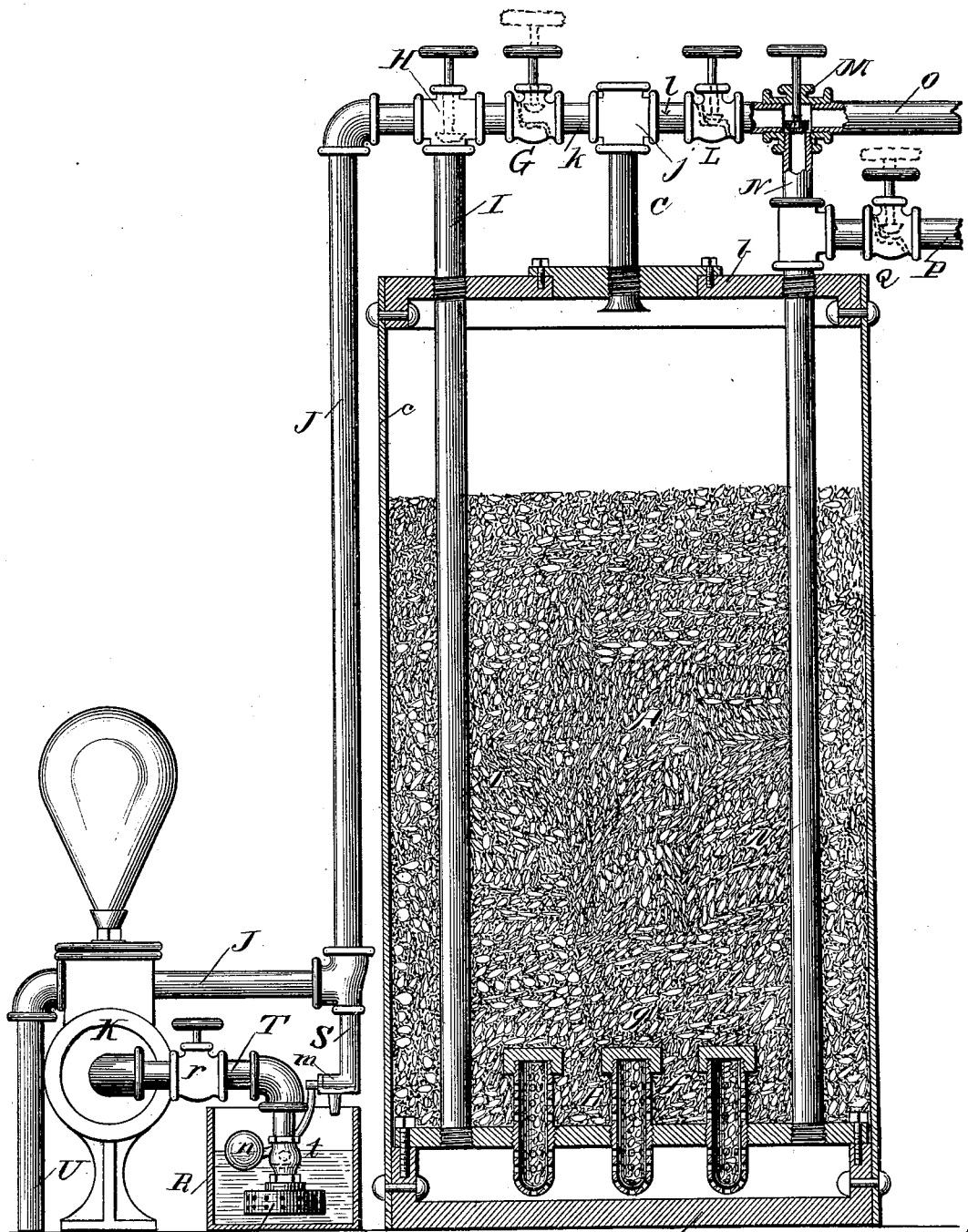

UNITED STATES PATENT OFFICE.

OMAR H. JEWELL, OF CHICAGO, ILLINOIS.

WATER FILTER AND PURIFIER.

SPECIFICATION forming part of Letters Patent No. 377,388, dated February 7, 1888.

Application filed June 18, 1887. Serial No. 241,788. (No model.)

*To all whom it may concern:*

Be it known that I, OMAR H. JEWELL, a citizen of the United States of America, residing at Chicago, in the county of Cook and State of Illinois, have invented certain new and useful Improvements in Water Filters and Purifiers, of which the following is a specification, reference being had therein to the accompanying drawing.

This invention relates to devices for filtering and purifying water to make it suitable for feeding steam-boilers and healthful for drinking and cooking purposes; and it has for its object to provide an apparatus that by filtering and by the automatic admixture of chemicals will clarify the most impure water, and also in devices in connection therewith for washing out such apparatus from time to time for removing the impure sediments collected therein; and the invention consists in certain improvements in the apparatus for which I have already filed application for Letters Patent of the United States on June 10, 1887, being Serial No. 240,972, all as fully hereinafter described and specifically claimed.

The accompanying drawing represents a sectional elevation of the entire apparatus, in which—

A denotes the tank, consisting of plates *a* and *b*, secured into the top and bottom of sheet-metal shell *c*. Upon the marginal flange of bottom plate, *a*, is secured by screws a plate, B, providing a chamber between plates *a* and B. This plate B is bored and screw-threaded for securing therein a series of tubes, *f*, having semi-spherical bottoms and being closed on top by screw-caps *g*. These tubes *f* are perforated with small holes, are filled with gravel, and are screwed into plate B, to extend vertically nearly equal distance from each face thereof in a manner that the only communication between the chambers above and below plate B is through the perforations in tubes *f* and through the gravel packed therein.

Through the center of top plate, *b*, of tank A is projected the end of a pipe, C, connected at its upper end by a cross-coupling, *j*, with two pipes, *l* and *k*. Pipe *k* couples with valve G, which again connects with valves H, from which one pipe, I, is projected through plates *b* and B of tank A, communicating with the chamber between plates *a* and B, while another pipe, J, connects with the discharge-valve chamber of steam-pump K. The pipe *l* connects with valve L, again connecting with valve M, from which one pipe, N, is projected through plates *b* and B; also communicating with the chamber intermediate of plates *a* and B, while another pipe, O, is to lead into the sewer or other waste offlet. Intermediate of valve M and the top of tank A the pipe N has coupled a branch pipe, P, leading into a reservoir, from which the filtered water is to be drawn as required, and this pipe P is provided with a valve, Q.

The tank A is to be filled with gravel and sand, and the operation of filtering and of washing out is the same as described in my former application referred to.

The tank R is kept filled with water to the desired elevation through pipe S, being a branch of pipe J, and through a faucet, *m*, secured to the end thereof and regulated by a float, *n*. Another pipe, T, communicates, through the pump-cover, with the interior of the pump-cylinder, and has to its pendent end a check or suction valve, *t*, and below this a rose-head strainer, *p*, that is thus suspended to near the bottom of tank R. The pump with each stroke will not only draw water through suction-pipe V, but will also draw a small amount from tank R through pipe T, that is regulated by valve *r*. Alum or other suitable chemicals having the properties of precipitating the impurities contained in the water, being filled into tank R and slowly dissolved by the water therein, and the solution being drawn into the pump-cylinder, a small quantity with each stroke of the piston, will be thoroughly intermingled with the water to be purified by the commotion caused in forcing such water through the pump and through pipes J and C.

What I claim is—

1. In an apparatus for the purpose described, the combination of a tank, A, having a false bottom, B, as described, said false bottom being provided with tubes *f*, screwed through it and perforated above and below the false bottom, with the pipes L and N extending down through the tank and communicating with the space beneath the false bottom, a supply-pipe, J, having the short pipe C, opening into the top of the tank, and the pipes I and N connected with it, and provided with valves H and M at top of pipes I and N, and valves G and L between the tops of said pipes and the short pipe C, substantially as and for the purpose set forth.

2. The combination, with the filtering-tank and pump K, having suction-pipe V and discharge-pipe J, leading into the filtering-tank, of tank R, supplied with water from pipe J through faucet m, regulated by float n, and of pipe T, communicating with the pump-cylinder through the cover of the same, and being provided with regulating-valve r, check-valve t, and rose-head p, suspended into the bottom of tank R, all substantially as and for the purpose described, to operate as specified.

In testimony whereof I affix my signature in presence of two witnesses.

OMAR H. JEWELL.

Witnesses:
WILLIAM H. LOTZ,
OTTO LUBKERT.